(12) United States Patent
Whitehouse et al.

(10) Patent No.: US 10,543,899 B2
(45) Date of Patent: Jan. 28, 2020

(54) AIRCRAFT HORIZONTAL STABILISER FITTED WITH LEADING-EDGE STRAKE

(75) Inventors: Ian Roy Whitehouse, Chepstow (GB); Carsten Weber, Bremen (DE); Markus Fischer, Weyhe-Lahausen (DE); Alain Tanguy, Toulouse (FR)

(73) Assignees: AIRBUS OPERATIONS LIMITED, Bristol (GB); AIRBUS OPERATIONS GMBH, Hamburg (DE); AIRBUS OPERATIONS SAS, Toulouse (FR)

( * ) Notice: Subject to any disclaimer, the term of this patent is extended or adjusted under 35 U.S.C. 154(b) by 543 days.

(21) Appl. No.: 13/502,175

(22) PCT Filed: Oct. 18, 2010

(86) PCT No.: PCT/EP2010/065662
§ 371 (c)(1),
(2), (4) Date: Apr. 16, 2012

(87) PCT Pub. No.: WO2011/048064
PCT Pub. Date: Apr. 28, 2011

(65) Prior Publication Data
US 2012/0205490 A1 Aug. 16, 2012

(30) Foreign Application Priority Data
Oct. 20, 2009 (FR) .................................. 09 05033

(51) Int. Cl.
*B64C 5/02* (2006.01)
(52) U.S. Cl.
CPC ....................... *B64C 5/02* (2013.01)

(58) Field of Classification Search
USPC .......................................................... 244/89
See application file for complete search history.

(56) References Cited

U.S. PATENT DOCUMENTS

| | | | | |
|---|---|---|---|---|
| 4,161,300 A | * | 7/1979 | Schwaerzler | B64C 39/12 244/214 |
| 4,231,536 A | * | 11/1980 | Ishimitsu et al. | 244/135 A |
| 4,267,990 A | * | 5/1981 | Staudacher | 244/52 |
| 4,291,853 A | | 9/1981 | Sigalla | |
| 4,739,957 A | * | 4/1988 | Vess et al. | 244/199.1 |
| 4,869,443 A | * | 9/1989 | Skow | 244/99.1 |
| 5,069,402 A | * | 12/1991 | Wortman | 244/130 |
| 5,103,712 A | * | 4/1992 | Minovitch | B64D 1/00 198/804 |
| 5,275,360 A | * | 1/1994 | Porter et al. | 244/119 |
| 5,707,029 A | * | 1/1998 | McIntosh | 244/225 |
| 5,758,844 A | * | 6/1998 | Cummings | 244/7 C |
| 6,113,028 A | * | 9/2000 | Lohse et al. | 244/13 |

(Continued)

FOREIGN PATENT DOCUMENTS

GB 2055729 A 3/1981

OTHER PUBLICATIONS

International Search Report and Written Opinion for Application No. PCT/EP2010/065662, dated Jun. 27, 2011.

*Primary Examiner* — Jessica B Wong
(74) *Attorney, Agent, or Firm* — Nixon & Vanderhye P.C.

(57) ABSTRACT

An adjustable, or all-moving, horizontal stabiliser for an aircraft, the stabiliser having a leading edge, a trailing edge, a root and a tip, and a strake fixed with respect to the stabiliser and attached to, or integrally formed with, the stabiliser leading edge adjacent the root.

5 Claims, 5 Drawing Sheets

(56) References Cited

U.S. PATENT DOCUMENTS

| | | | | |
|---|---|---|---|---|
| 6,698,688 | B1* | 3/2004 | Jones | 244/99.3 |
| 7,581,696 | B2* | 9/2009 | Morgan et al. | 244/90 R |
| 7,810,758 | B2* | 10/2010 | Garcia Laja et al. | 244/131 |
| 8,074,925 | B2* | 12/2011 | Morgan et al. | 244/90 R |
| 8,256,704 | B2* | 9/2012 | Lundgren | 244/7 C |
| 8,302,903 | B2* | 11/2012 | Morgan et al. | 244/90 R |
| 8,757,537 | B2* | 6/2014 | Walliser | 244/17.19 |
| 2006/0157613 | A1* | 7/2006 | Adamson et al. | 244/1 N |
| 2007/0102575 | A1* | 5/2007 | Morgan et al. | 244/87 |
| 2008/0164375 | A1* | 7/2008 | Garcia Laja | B64C 1/12 244/131 |
| 2009/0206206 | A1* | 8/2009 | Chase et al. | 244/199.4 |
| 2009/0283632 | A1* | 11/2009 | Morgan et al. | 244/87 |
| 2011/0095137 | A1* | 4/2011 | Tracy et al. | 244/35 R |
| 2013/0341459 | A1* | 12/2013 | Kosheleff | 244/36 |

* cited by examiner

AIRCRAFT HORIZONTAL STABILISER FITTED WITH LEADING-EDGE STRAKE

RELATED APPLICATIONS

The present application is a National Phase of International Application Number PCT/EP2010/065662, filed Oct. 18, 2010, and claims priority from French Application Number 09/05033, filed Oct. 20, 2009.

FIELD OF THE INVENTION

The present invention applies to an aircraft horizontal stabiliser, with particular application on a transport aircraft.

BACKGROUND OF THE INVENTION

To put the matter in simple terms, we know that aircraft horizontal stabilisers are aerodynamic surfaces in a typically trapezoid form whose leading edge is typically virtually straight (but not necessarily), and often fitted with control surface(s) on the trailing edge. On large aircraft, the horizontal stabiliser usually also has a feature whereby the leading edge moves vertically (as the stabiliser is rotated relative to the aircraft fuselage), which improves the aircraft's flight and general performance characteristics. On small aircraft, the leading edge of the horizontal stabiliser is often fixed.

The horizontal stabiliser is an aerodynamic surface whose purpose is to ensure good flying qualities (stability, handling and balance) in all flying conditions.

However its very existence creates aerodynamic drag, which acts negatively on the aircraft's performance.

In order to improve this performance, we can try to reduce the surface area of the horizontal stabiliser, but without degrading the aircraft's flying qualities.

We know that on the majority of short-haul aircraft of the "under wing" engine type, several criteria are used to dimension the surface of the horizontal stabiliser depending on the position of the aircraft's centre of gravity, namely:

balance criteria (the horizontal stabiliser must always be able to guarantee the desired attitude of the aircraft):
a) the ability to balance the aircraft throughout its flight envelope with a forward centre of gravity;
b) the ability to balance the aircraft throughout its flight envelope with an aft centre of gravity;
stability criteria (the aircraft must remain stable whatever the flight phase):
c) the point of manoeuvre: the aircraft's limit of stability with an aft centre of gravity; and
handling criteria (the aircraft must be able to provide the pitch necessary for carrying out the desired manoeuvres):
d) the so-called "pushover" manoeuvre, at forward centre of gravity during which the horizontal stabiliser experiences extremely negative angles of attack (aircraft pitch nose down); and
e) the so-called "CEV" manoeuvre, at aft centre of gravity during which the horizontal stabiliser experiences extremely positive angles of attack (aircraft pitch nose up).

These criteria can be classified into two categories: linear criteria and non-linear criteria. More precisely:

criteria a) and b) are directly governed by the linear gradient of the horizontal stabiliser at a fixed angle of attack and given by the minimum and maximum deflection of the said horizontal stabiliser. At this given angle of attack, the steeper the gradient, the more lift is created in absolute value and the more the criterion is improved; and criterion c) mentioned above is a stability criterion, which is also directly linked to the linear efficiency of the horizontal stabiliser. The steeper this gradient, the more significant stability becomes and the less the criterion is critical to dimensioning.

In addition, the linear efficiency of the horizontal stabiliser is defined by its planform, principally by its aspect ratio and its sweep angle.

Furthermore, criteria d) and e) call on non-linear characteristics of the plane. This means that the "pushover" manoeuvre is linked to stalling of the horizontal stabiliser at negative angles of attack. As far as the "CEV" manoeuvre is concerned, this is deduced from the maximum positive lift that the horizontal stabiliser is capable of providing with a positive deflection of the control surface.

These non-linear and stalling characteristics are mainly linked to the aerodynamic profiles used. The angles of attack for stalling are also sensitive to the linear characteristics of the plane.

The fact of increasing the efficiency of the horizontal stabiliser leads to a degradation of the angles of attack for stalling the stabiliser surface. The linear and non-linear characteristics therefore act against each other and the effect on the size of the horizontal stabiliser is virtually neutral (i.e. no increase in $C_{Lmax}$).

In addition, to be able to reduce the size of the horizontal stabiliser, we need to improve the non-linear characteristics of the stabiliser surface while keeping the linear characteristics (and therefore the planform) constant.

SUMMARY OF THE INVENTION

The present invention is intended for use on an aircraft's horizontal stabiliser comprising a leading edge and a trailing edge, enabling the above-mentioned disadvantages to be corrected.

To this end, according to a first aspect of the invention, the said stabiliser is notable in that it comprises a strake (fillet) which represents a generally flat aerodynamic surface defining a leading edge and a trailing edge, the trailing edge of this strake is integral with the leading edge of the horizontal stabiliser at the latter's root, and the leading edge of the said strake has, at the junction of the said leading edge with the leading edge of the horizontal stabiliser, a sweep angle greater than 45°.

A second aspect of the invention provides an adjustable, or all-moving, horizontal stabiliser for an aircraft, the stabiliser having a leading edge, a trailing edge, a root and a tip, and a strake fixed with respect to the stabiliser and attached to, or integrally formed with, the stabiliser leading edge adjacent the root.

An "adjustable" horizontal stabiliser is hinged so that its setting (angle of incidence) can be altered with respect to the aircraft fuselage in flight. A "fixed" horizontal stabiliser has a fixed incidence with respect to the aircraft fuselage. Both adjustable and fixed horizontal stabilisers typically have a moveable control surface (elevator) hinged at the stabiliser trailing edge. The benefit of an adjustable stabiliser is that the stabiliser can be set to desired angle of incidence such that the elevator is in its trimmed position. The elevator of a fixed horizontal stabiliser has a trim tab for trimming the elevator.

An "all-moving" (or "all-flying") horizontal stabiliser is hinged so that its setting (angle of incidence) can be altered with respect to the aircraft fuselage in flight and combines the functions of an elevator and horizontal stabiliser. It therefore has no separate elevator and is sometimes referred to as a "stabilator".

The second aspect of the invention therefore relates to any aircraft horizontal stabiliser (with or without an elevator control surface) that is adjustable to alter its angle of incidence with respect to the aircraft fuselage in flight. Typically, adjustable (or all-moving) horizontal stabilisers are hinged about a point aft of the stabiliser leading edge such that the leading edge moves vertically with respect to the aircraft fuselage during adjustment of the stabiliser setting (angle of incidence).

It is known in the art that the term "strake" has many synonyms, e.g. apex, fillet, vortex generator, chine, fence, leading edge extension (LEX), leading edge root extension (LERX), vane, etc. It is a device adapted to create vortices which interact with the airflow around the structure or surfaces downstream to beneficial effect at one or more parts of the flight envelope.

Thanks to this invention, therefore, and as defined below, we can reduce the surface area of the said horizontal stabiliser and thus reduce the drag on the aircraft on which it is fitted. The said strake actually enables us to delay the appearance of aerodynamic stalling on certain zones of the horizontal stabiliser when the latter is dimensioned by its ability to produce pitch at a high angle of attack.

We know that, to guarantee a high Mach number during cruising and a low structural weight, the horizontal stabilisers of modern aircraft generally have a significant sweep angle with a taper ratio of less than 1. Consequently, the local aerodynamic lift linked to the angle of attack to which the plane is subjected is greater at the tip of the stabiliser than at its root. Thus, since the local lift for each section of span is limited to a maximum level fixed by the characteristics of the profile used, for high angles of attack the stabiliser loses lift first on the outer part of the span, then this loss moves progressively towards the root. If non-linear phenomena begin on the outer part, the loss of lift is obtained by the propagation of this separation towards the inner part of the stabiliser.

Now, in the first aspect of the invention the strake as defined above has a sweep angle at the root which is significantly greater than that of the horizontal stabiliser. This strake enables the creation of vortices at a high angle of attack (positive or negative) which prevent the propagation of flow separation (from the outer part) towards the inner part of the stabiliser. We therefore obtain characteristics of the horizontal plane that are unchanged in the linear zone and modified in the zones where the non-linear phenomena appear. In consequence, although the appearance of the non-linear phenomena (end of the linear zone) is not changed, the properties are improved at a high angle of attack, which enables (in absolute value) the minimum and maximum coefficients of lift to be increased. Improving the quality criteria of non-linear flight enables the size of the horizontal stabiliser to be reduced.

We can also see that the solution in line with the present invention enables the following:
   a reduction in the loads at the root due to more significant aerodynamic forces inboard; and
   a reduction in the size of the spar flanges intended to withstand bending moments, due to a larger chord at the root.

The two advantages above enable the weight of the horizontal stabiliser to be reduced.

In the context of the first aspect of the present invention, the strake can be produced in a number of sizes and shapes. In particular, the leading edge of the strake can be either straight or curved.

Furthermore, the first aspect of the present invention can be applied to any type of horizontal stabiliser, for example with the property that it is movable or fixed.

In the stabiliser of the second aspect, the strake leading edge may have an arcuate planform. In particular, the strake leading edge may have a circular arc planform. The arc radius may be greater than the strake spanwise width. Alternatively, the strake leading edge may have an elliptic arc planform. The minor radius of the elliptic arc may be greater than the strake spanwise width.

In the stabiliser of the second aspect, the strake may have a chord length greater than its spanwise width.

In the stabiliser of the second aspect, the strake may be substantially planar. In particular, the strake may be a substantially flat plate. Alternatively, the strake may have form, preferably with variable thickness and/or camber. The shape and form of the strake and stabiliser may be blended.

The stabiliser of the second aspect may further comprise a moveable control surface at the stabiliser trailing edge.

A further aspect of the invention provides an aircraft having two of the horizontal stabilisers, which are arranged on either side of a longitudinal axis of the aircraft.

The horizontal stabiliser may be mounted on the aircraft fuselage (empennage).

The aircraft may further comprise a vertical stabiliser. The horizontal stabiliser may be mounted on the vertical stabiliser. The horizontal stabiliser may be mounted adjacent the tip of the vertical stabiliser, so as to provide a "T-tail" configuration. Alternatively, the horizontal stabiliser may be mounted intermediate the tip and root of the vertical stabiliser, so as to provide a "cruciform tail" configuration.

BRIEF DESCRIPTION OF THE DRAWINGS

Embodiments of the invention will now be described with reference to the accompanying drawings, in which identical references denote similar components, and in which.

DETAILED DESCRIPTION OF EMBODIMENT(S)

Figure 1:
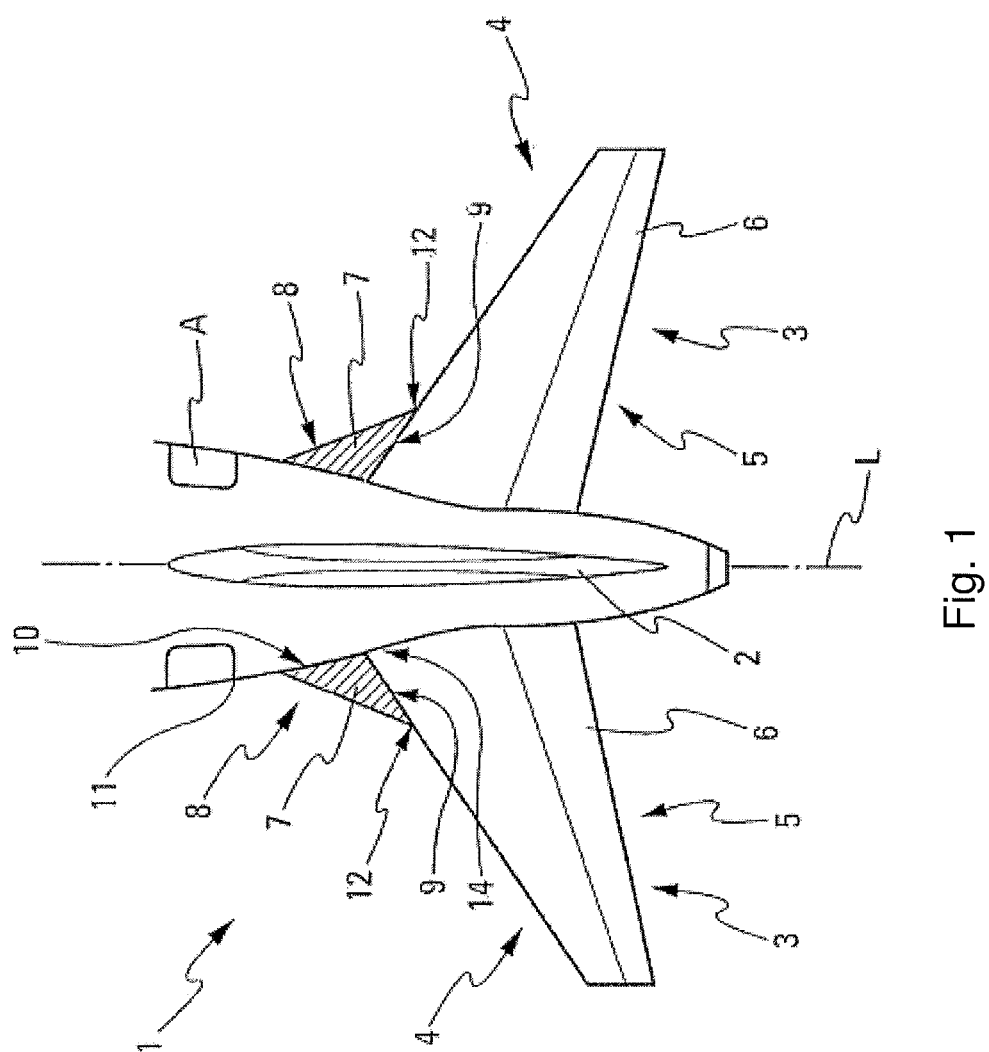
FIG. 1 is a schematic diagram of an aircraft tail fitted with horizontal stabilisers according to a first embodiment of the invention.

In FIG. 1, we have shown the aft section 1 of an aircraft A, (a transport aircraft) whose longitudinal axis is L, which is fitted:

with a standard fin (vertical stabiliser/tailplane) 2 set along the said longitudinal axis L; and on each side of the said longitudinal axis L, a horizontal stabiliser 3. Each horizontal stabiliser 3 has a leading edge 4 and a trailing edge 5 fitted, in the usual way, with an elevator 6.

With a particular view to reducing the drag on aircraft A, each horizontal stabiliser 3 has, according to a first embodiment of the invention, a strake 7 which represents a generally flat aerodynamic surface comprising three points which define a leading edge 8, a trailing edge 9 and an edge 10 intended for the root. The trailing edge 9 of each strake 7 is integral with the leading edge 4 of the horizontal stabiliser 3 at the latter's root 14; in other words, inboard at the fuselage 11 of aircraft A. Furthermore, according to the invention, the strake 7 has, at the root 14, a sweep angle that is significantly greater than that of the horizontal stabiliser 3. The leading edge 8 of the strake 7 has, at the junction 12 of the said leading edge 8 with the leading edge 4 of the horizontal stabiliser, a sweep angle greater than 45°.

Figure 2:
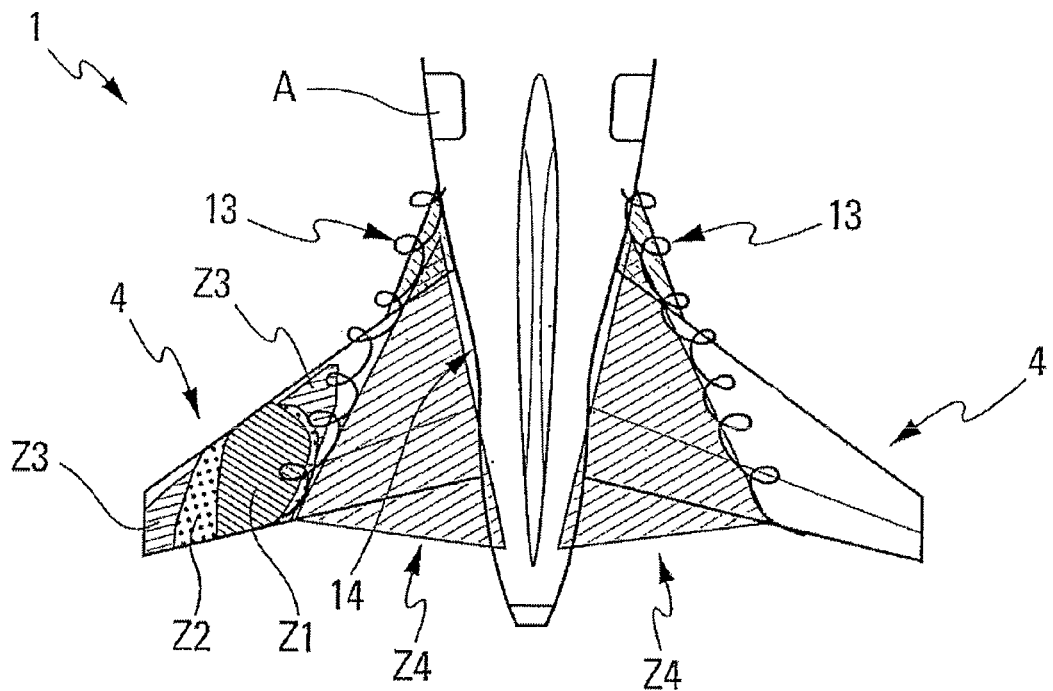
FIG. 2 is a schematic diagram of the generation of vortices at a high angle of attack, created at the tail shown in FIG. 1.

This type of strake 7 allows the creation of vortices 13 at a high angle of attack as shown in FIG. 2. Flow separations generally appear on the outer part of the horizontal stabiliser 3, illustrated by a zone Z1 in FIG. 2, then spread progressively into zones Z2 and Z3, as far as the root 14. The stall is obtained when this separation has propagated as far as the inner part of the horizontal stabiliser 3. Now, the vortices 13 created by a strake 7 at high angle of attack prevent the propagation of the separation towards the inner part of the stabiliser 3 by creating a protected zone Z4. So, thanks to the strake 7 according to the invention, the horizontal stabiliser 3 has characteristics in the horizontal plane that are unchanged in the linear zone and modified in the zones where non-linear phenomena appear. In consequence, although the appearance of the non-linear phenomena (end of the linear zone) is not changed, the properties are improved at a high angle of attack, which enables (in absolute value) the positive and negative maximum coefficients of lift ($C_{Lmax}$) to be increased. Improving the quality criteria of non-linear flight enables the size of the horizontal stabiliser 3 to be reduced.

Figure 3:
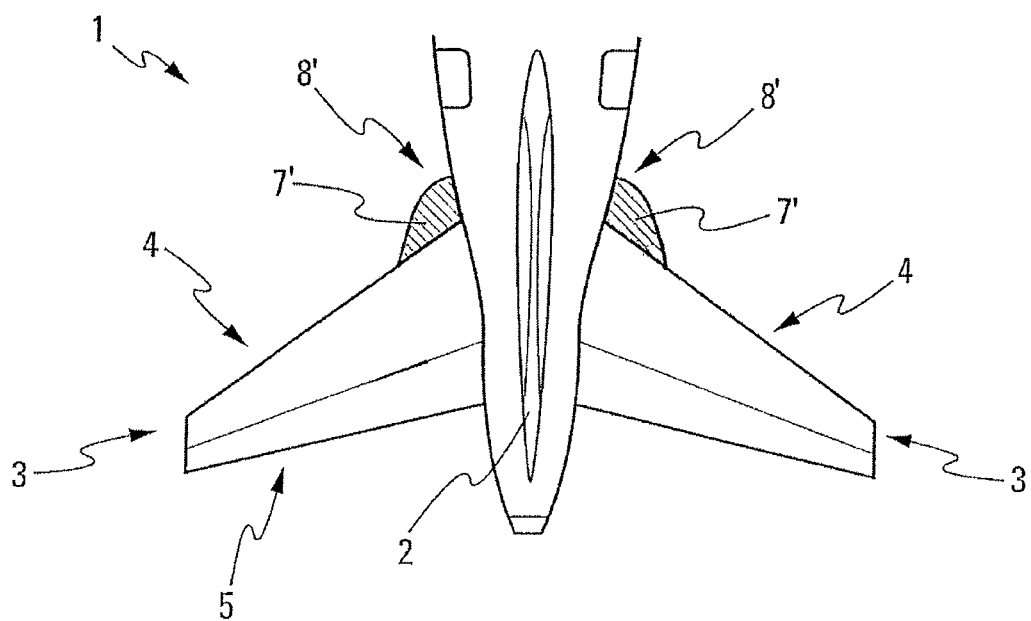
FIG. 3 is similar to FIG. 1 but the horizontal stabilisers are fitted with strakes having a curved leading edge according to a second embodiment of the invention.

In the context of the present invention, the strake 7 can be produced in a number of sizes and shapes. In particular, the leading edge 8 of the strake 7 can be:

straight as shown in FIG. 1; or curved (the strake 7' of the second embodiment has a curved leading edge 8', while retaining a sweep angle that has the above-mentioned characteristics of the junction 12), as shown in FIG. 3.

Furthermore, the present invention can be applied to any type of horizontal stabiliser 3, in particular:

a fixed horizontal stabiliser that is fitted to the fuselage of the aircraft;

a horizontal stabiliser with a moving part (control surface 6), which is also fitted to the fuselage of the aircraft A, as shown in FIGS. 1 to 3;

a fixed or movable horizontal stabiliser fitted on the top of the aircraft's tail fin;

a fixed or movable horizontal stabiliser fitted in an intermediate position on the fin.

A practical problem for a movable horizontal stabiliser, e.g. an "adjustable" or "all-moving" horizontal stabiliser, is that the area of fuselage or fin swept by the total root chord of the stabiliser and strake (edge 10 and root 14 combined) is increased. This can rule out the use of a strake on the horizontal stabiliser since the effects on the fuselage shape or fin chord can negate any potential benefits.

The shape of the strake is therefore of particular importance when applied to a movable horizontal stabiliser, and a strake shape which can minimise the strake root chord for a given strake planform area can provide additional aerodynamic benefits.

Figure 4:
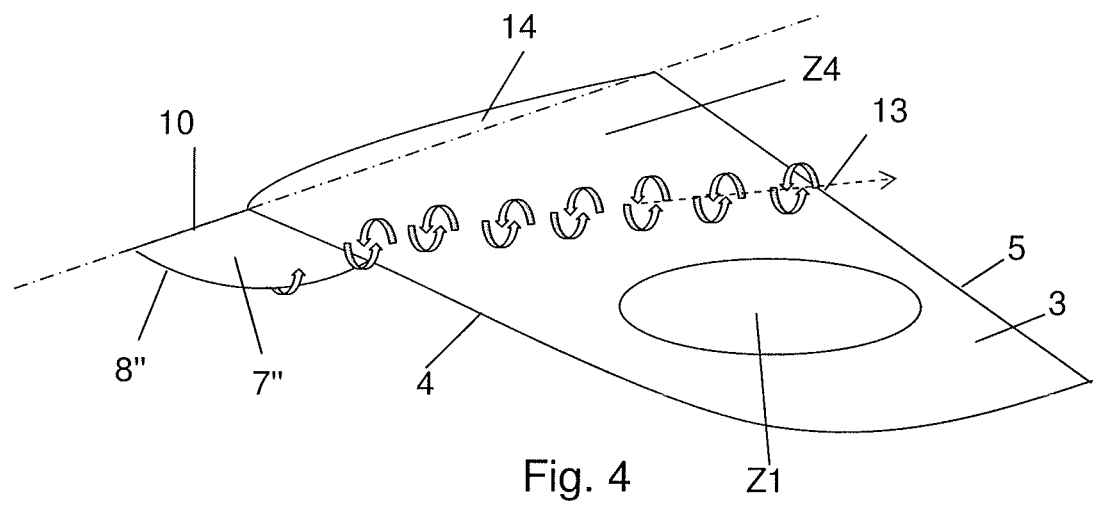
FIG. 4 is a schematic diagram of a horizontal stabiliser with a 'gothic' shaped strake according to a third embodiment of the invention.

FIG. 4 illustrates schematically a third embodiment of the invention and shows the horizontal stabiliser 3 with a 'gothic' shaped strake 7". The horizontal stabiliser 3 is movable and may be either an adjustable horizontal stabiliser with an elevator (not shown) identical or similar to that shown in FIG. 1, or alternatively may be an all-moving horizontal stabiliser (or stabilator). The horizontal stabiliser 3 is hinged for movement with respect to the aircraft A so as to vary the angle of incidence of the stabiliser 3 with respect to the aircraft fuselage 11 (not shown in FIG. 4).

The movable horizontal stabiliser 3 may be mounted on the aircraft fuselage 11 (empennage) as shown in FIG. 1, or alternatively may be mounted on the fin 2 (not shown in FIG. 4) either adjacent the tip to provide a "T-tail" configuration, or intermediate the tip and root of the fin to provide a "cruciform tail" configuration.

The 'gothic' shaped strake 7" has a leading edge 8", which creates a streamwise vortex 13 which passes over, or under, the horizontal stabiliser 3 to which it is attached. As the horizontal stabiliser incidence increases it will typically begin to stall from a region Z1 adjacent the tip inwards and lift is lost. The strake vortex 13 hinders the spread of the stalled area on the stabiliser and so increases the maximum attainable lift. A second benefit is that the stall is progressive rather than sudden as is otherwise likely.

The strake 7" is attached to, or integrally formed with, the horizontal stabiliser 3 leading edge 4 adjacent the root 14. Since the horizontal stabiliser 3 is movable in pitch, the strake 7" is not fixed to the aircraft fuselage or fin.

The 'gothic' shape of strake 7" minimises the swept area, or footprint, of the stabiliser/strake combination on the fuselage (or fin, depending on the tail configuration) for a given strake planform area. Minimising this swept area minimises the impact of the strake 7" on the fuselage shape or fin chord required to accommodate the movable horizontal stabiliser.

A typical 'gothic' shape is a secant ogive formed by a pair of intersecting arcs. Ogives can also be elliptic in form. The centre of each arc is on a line perpendicular of two parallel sides. The position of the arc centre on this line determines the sharpness ratio. The ogive shape is found in much gothic architecture (arches, windows, etc.) and ballistics. The arc radius can be greater or less than the span of the parallel sides. Of course, each 'gothic' shaped strake 7" is only one half of the ogive.

Figure 5:
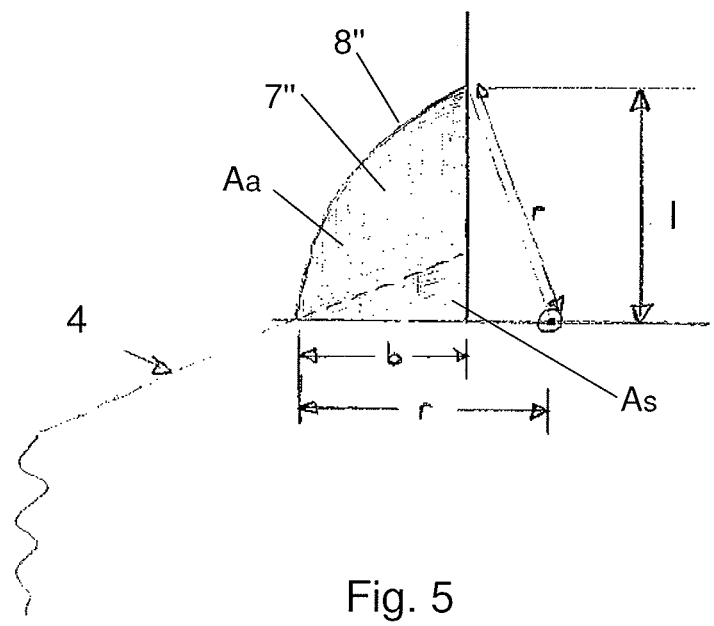
FIG. 5 is a schematic diagram of the 'gothic' strake of FIG. 4 in planform.

FIG. 5 illustrates the definition of this 'gothic' shape as applied to the strake 7". The strake leading edge 8" planform is generated from an arc of radius 'r', which intersects the stabiliser leading edge 4 along a line spanwise perpendicular to the aircraft longitudinal axis 'L'. The strake span 'b' extends along this line from the fuselage (or fin) to the strake leading edge 8". The strake length 'l' extends from this line to the point of intersection of the strake leading edge 8" with the fuselage (or fin). The radius 'r' is greater than the span 'b'.

Where:

$$r = \frac{l^2 + b^2}{2b}$$

The strake area $A_a$ includes an area $A_s$ shared with the horizontal stabiliser, which for a stabiliser with a straight leading edge will be triangular.

Although FIG. 5 illustrates a strake with a leading edge having a circular arc planform, it will be appreciated that an alternative strake may have an elliptic arc planform. In this case, the minor radius of the elliptic arc will be greater than the strake span.

Figure 6A:
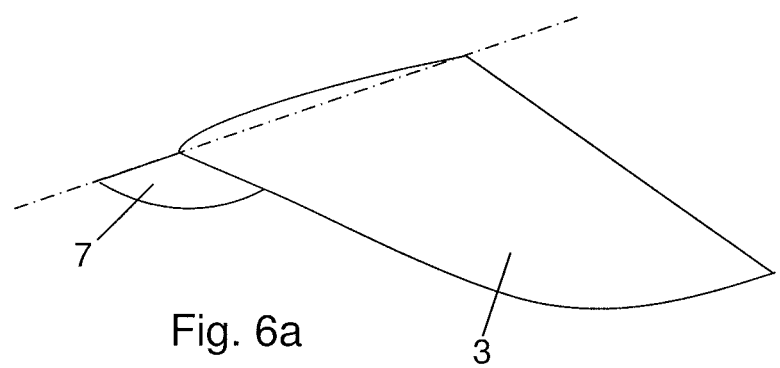
FIGS. 6a-c illustrate variants of the third embodiment with the 'gothic' strake formed as a flat plate (6a), with form (6b), and with form and blending (6c)
Figure 6B:
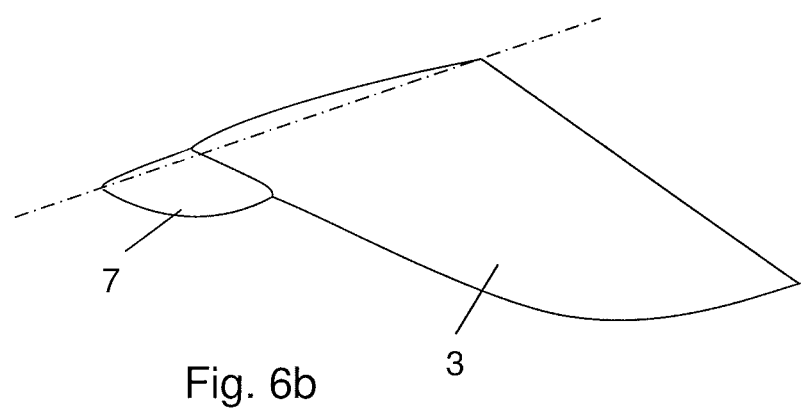
Figure 6C:
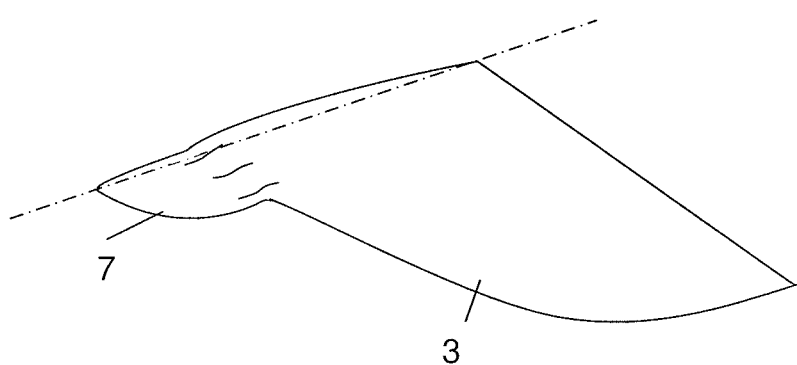
Figure 7:
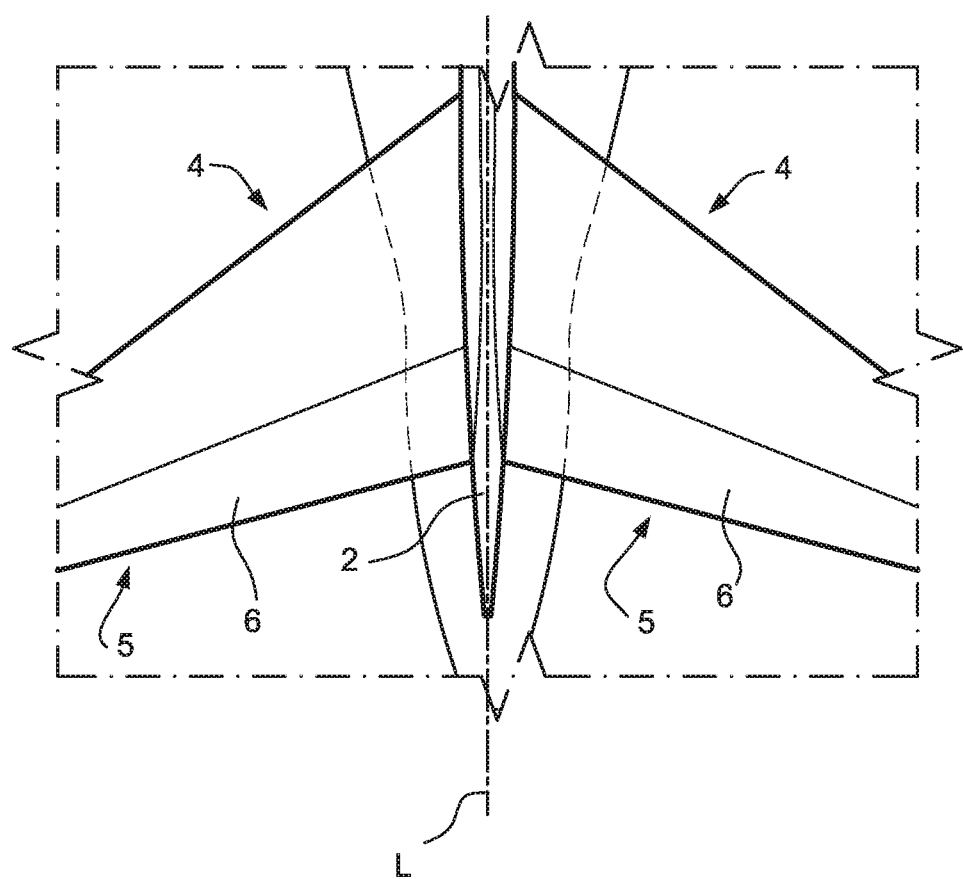
FIG. 7 illustrates the embodiment with the horizontal stabilizer being mounted on the vertical stabilizer.

The strake may be plate-like or may have form. The strake may be substantially planar or may have variable thickness and/or camber. FIGS. 6a-c illustrate variants of the 'gothic' shaped strake shown in FIG. 4, but it will be appreciated that these variants could equally apply to any shape of strake, e.g. the 'triangular' or 'curved' strakes shown in FIGS. 1 and 3. The strake is therefore denoted generally by the numeral 7 in FIGS. 6a-c.

In FIG. 6a the strake 7 is substantially planar and is formed as a flat plate. In FIG. 6b, the strake 7 has form and may have thickness variation and/or camber. In FIG. 6c the strake 7 has form and the shape and/or form of the strake and the stabiliser 3 are merged with fillets and/or blending.

In consequence, thanks to the addition of a strake 7 as mentioned above, we can reduce the surface area of the horizontal stabiliser 3 and thus reduce the aerodynamic drag on aircraft A on which it is fitted. The said strake actually enables us to delay the appearance of aerodynamic stalling on certain zones of the horizontal stabiliser 3 when the latter is dimensioned by its ability to produce pitch at a high angle of attack. We can also see that the solution in line with the present invention enables the following:

- a reduction in the loads at the root 14 due to more significant aerodynamic forces inboard; and
- a reduction in the size of the spar flanges intended to withstand bending moments, due to a larger chord at the root 14.

The two advantages above enable the weight of the horizontal stabiliser 3 to be reduced.

In addition, the shape of the strake can be configured to minimise the total root chord of the stabiliser/strake for a given strake planform area. This has particular benefits in the case of an adjustable, or all-moving, horizontal stabiliser.

Although the invention has been described above with reference to one or more preferred embodiments, it will be appreciated that various changes or modifications may be made without departing from the scope of the invention as defined in the appended claims.

The invention claimed is:

1. An aircraft including a fuselage and a tail, the tail comprising:
    a vertical stabiliser having a leading edge, a trailing edge, a root, and a tip;
    an adjustable, or all-moving, horizontal stabiliser,
    the horizontal stabiliser having a leading edge, a trailing edge, a root and a tip, and a strake fixed with respect to the horizontal stabiliser and attached to, or integrally formed with, the horizontal stabiliser leading edge adjacent the root of the horizontal stabiliser,
    wherein the strake has a straight leading edge that extends from the leading edge of the horizontal stabiliser to a side of the fuselage,
    and wherein the leading edge of the strake does not extend forward of the leading edge of the vertical stabiliser at the root of the vertical stabiliser.

2. An aircraft according to claim 1, wherein the strake is substantially planar.

3. An aircraft according to claim 2, wherein the strake has a chord length greater than its spanwise width.

4. An aircraft according to claim 1, wherein the horizontal stabiliser is mounted on the fuselage.

5. An aircraft according to claim 1, wherein the straight leading edge of the strake extends along its entire length from the leading edge of the stabiliser to the side of the fuselage.

* * * * *